(12) United States Patent
Dubin et al.

(10) Patent No.: US 7,413,328 B2
(45) Date of Patent: Aug. 19, 2008

(54) REMOTELY COUPLED HYBRID HUD BACKLIGHT

(75) Inventors: Matthew Dubin, Tucson, AZ (US); Brent Larson, Cave Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 39 days.

(21) Appl. No.: 11/027,558

(22) Filed: Dec. 30, 2004

(65) Prior Publication Data

US 2006/0146518 A1    Jul. 6, 2006

(51) Int. Cl.
*F21V 33/00* (2006.01)
*B64D 47/00* (2006.01)

(52) U.S. Cl. .................. 362/471; 362/602; 362/561; 362/26; 362/27; 345/7; 345/8

(58) Field of Classification Search .......... 362/26, 362/27, 3, 602, 561, 555, 19; 345/7–9, 102, 345/107
See application file for complete search history.

(56) References Cited

U.S. PATENT DOCUMENTS

| | | | | |
|---|---|---|---|---|
| 4,263,594 A | * | 4/1981 | Masucci | 345/102 |
| 4,580,196 A | * | 4/1986 | Task | 362/471 |
| 5,053,765 A | * | 10/1991 | Sonehara et al. | 340/815.43 |
| 5,143,433 A | * | 9/1992 | Farrell | 362/29 |
| 5,211,463 A | * | 5/1993 | Kalmanash | 362/26 |
| 5,283,563 A | * | 2/1994 | Allen et al. | 349/77 |
| 5,293,437 A | * | 3/1994 | Nixon | 385/115 |
| 5,479,275 A | * | 12/1995 | Abileah | 349/5 |
| 5,657,163 A | * | 8/1997 | Wu et al. | 359/630 |
| 5,751,388 A |  | 5/1998 | Larson |  |
| 6,039,451 A | * | 3/2000 | Grave | 362/29 |
| 6,447,132 B1 | * | 9/2002 | Harter, Jr. | 362/29 |
| 6,601,980 B2 | * | 8/2003 | Kobayashi et al. | 362/510 |
| 6,758,586 B1 | * | 7/2004 | Wilhem et al. | 362/471 |
| 7,040,794 B2 | * | 5/2006 | Bernard | 362/555 |
| 2003/0107883 A1 |  | 6/2003 | Pienimaa et al. |  |

FOREIGN PATENT DOCUMENTS

DE    40 09 947 A1    10/1991

OTHER PUBLICATIONS

PCT International Search Report PCT/US2005/045260, Apr. 7, 2006.

* cited by examiner

*Primary Examiner*—Jacob Y Choi
(74) *Attorney, Agent, or Firm*—Ingrassia, Fisher & Lorenz, P.C.

(57) ABSTRACT

A head-up display assembly includes a liquid crystal display element, a first backlight light source, and a remote backlight light source. The first light source is physically mounted in proximity to the liquid crystal display element, and is operable to directly backlight illuminate the liquid crystal display element. The remote light source mounted physically remote from the liquid crystal display element, and is operable to backlight illuminate the liquid crystal display element via a light guide.

32 Claims, 7 Drawing Sheets

REMOTELY COUPLED HYBRID HUD BACKLIGHT

FIELD OF THE INVENTION

The invention relates generally to illuminating head-up display panels, and more specifically to remotely coupled hybrid backlights for head-up displays.

BACKGROUND OF THE INVENTION

Traditionally, airplanes have incorporated a variety of instrument gauges to indicate various parameters of flight to a pilot. The most basic of these traditional instruments are four gauges arranged in a traditional "T", pattern, and include airspeed, attitude, altitude, and directional indicators. Other gauges such as climb and flight path deviation indicators are also common, and are usually positioned near the basic "T" instrument cluster.

As mechanical gauge technology has been replaced with electronic and computerized flight indicator displays, integration of several of these traditional data elements onto one screen has become common, and displays such as liquid crystal displays (LCDs) have been configured to show a wide variety of flight data on a relatively small number of LCD screens. These screens can vary from airplane type to airplane type, and even between individual airplanes depending on the sensors and navigational systems installed on each aircraft.

Because the pilot must take his eyes away from the aircraft's canopy or windshield and scan the instruments from time to time, certain flight data is sometimes integrated and displayed via a head-up display (HUD). This HUD technology provides projection of an image onto the windshield or canopy, or onto a semitransparent eyepiece in the pilot's helmet to present information to the pilot without requiring looking down at an instrument cluster.

In some applications, traditional flight data such as glide slope, flight path deviation, and attitude indicators are incorporated into the HUD, while in other applications such as military applications the HUD displays are used for nontraditional applications such as target tracking. In both cases, the goal is to provide the pilot with data while eliminating the need to look away from the windshield toward an instrument cluster.

The image that creates the head-up display is typically projected from a cathode ray tube (CRT), much like those found in a traditional television set or computer monitor. The image to be projected is displayed on a CRT that is carefully positioned such that the image reflects off the windshield, canopy, or other semi-reflective reflector element in the pilot's helmet, thereby creating a visible image that is projected over the still-visible view through the pilot's helmet or windshield.

The CRT will desirably have a certain level of brightness in the image it produces, so that the image it creates is clearly visible on the reflector's semi-reflective surface but does not obscure viewing behind the reflector. Other factors that must be considered in designing a HUD display include the amount of weight and size required, especially for helmet-mounted displays that the pilot must support when wearing the attached helmet. This makes it desirable to utilize whatever display technologies can provide the desired brightness, resolution, and other required characteristics at the lowest weight, size, and cost.

It is therefore desired to reduce the weight, cost, and size of head-up display devices, particularly when applied to helmet-mounted head-up displays.

SUMMARY OF THE INVENTION

The present invention provides in one embodiment a head-up display assembly having a liquid crystal display element, a first backlight light source, and a remote backlight light source. The first light source is physically mounted in proximity to the liquid crystal display element, and is operable to directly backlight illuminate the liquid crystal display element. The remote light source is mounted physically remote from the liquid crystal display element, and is operable to backlight illuminate the liquid crystal display element via a light guide.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

Figure 1:
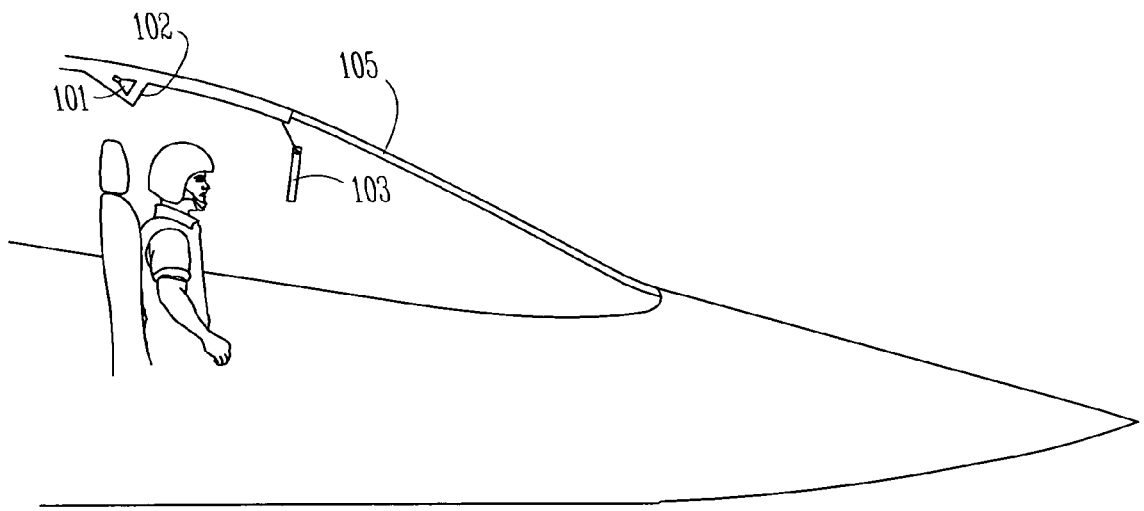
FIG. 1 shows a cathode ray tube-based head-up display, consistent with the prior art.

FIG. 1 shows a typical cathode ray tube (CRT) based head up display, consistent with the prior art. The cathode ray tube 101 is much like a traditional television picture tube, but operates at significantly higher brightness and under more demanding conditions. The image it produces is directed by a lens or group of lenses 102 to produce a virtual image on the combiner 103. The combiner is named for its transparency and its resulting ability to effectively combine images—that of the cathode ray tube and that which can be seen through the aircraft windshield 105. The projected image therefore appears to the pilot to overlay the view out the windshield, so that information can be conveyed to the pilot via the head up display without requiring the pilot to look away from the windshield.

The head-up display of FIG. 1 is located in close physical proximity to the pilot's head, and generates a significant amount of heat. Further, cathode ray tubes require a significant amount of space, and are somewhat more fragile than many other instrumentation technologies. They also require very high voltages be produced to accelerate and direct an electron beam that scans the front surface of the tube, which many other technologies don't need. It is therefore desirable to consider other display technologies, such as the liquid crystal display-based head up display embodiment of the present invention shown in FIG. 2.

Figure 2:
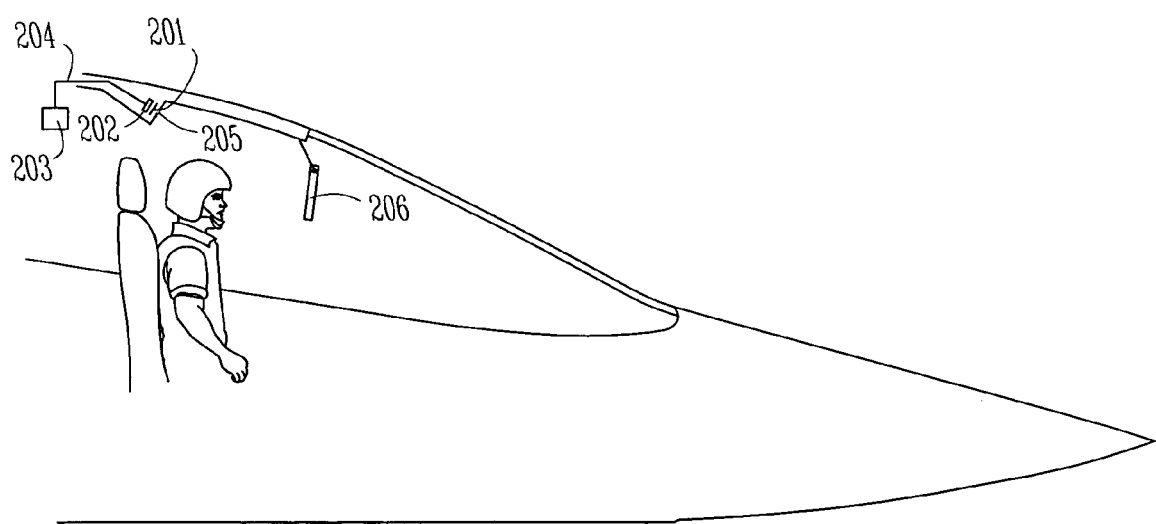
FIG. 2 shows a liquid crystal display head-up display with a remotely coupled hybrid light source, consistent with an embodiment of the present invention.

FIG. 2 illustrates how a liquid crystal display-based head up display having a local and remote light source relieve some of the problems of the CRT-based head up display. The liquid crystal display (LCD) shutter 201 serves to either block or pass light from a first light source 202, and also from selectively provided remote light source 203. The light provided by remote light source 203 is piped via light pipe 204 to the first light source chamber 202, where light from one or both of the light sources is used to backlight the LCD panel 201. The light pipe in some embodiments of the invention is a fiber optic cable, which transmits light with little loss from the source to the first light source chamber. The light from the first light source chamber is then used to backlight the LCD panel 201, which selectively passes or blocks light at various locations to form an image. This formed image is then projected using a lens or lenses 205, to form a virtual image on combiner 206.

In some embodiments of the invention, the first light source is a moderately bright light source such as a fluorescent light or light-emitting diode source that provides sufficient light to create an adequately bright head up display image on combiner 206 under most conditions. But, when viewed against a particularly bright background, such as a cloud in bright sunlight, additional light will be provided either automatically or as selected from the remote light source 203 to produce the desired projected image brightness. Because the remote light source 203 can be easily located remote from the pilot's head and other sensitive areas, it can utilize lamp technologies such as high intensity discharge, short arc mercury lamp, a laser, a light-emitting diode, a fluorescent lamp, a cold cathode lamp, or other lamps that may be too hot or bulky to locate in the overhead head up display projector.

In addition to serving as a supplemental light, the remote light 203 can serve as a redundant light source for first light source 202, so that if light source 202 fails the remote light 203 is used as the new primary light source. In one embodiment, each of the first light source 202 and the remote light 203 are capable of providing a minimum required light output, so that light provided to the combiner 206 is maintained at a minimum desired level in the event one of the light sources fails. The relative brightness of the first light source 202 and the remote light 203 will be different in various embodiments, whether or not the light output from each source is able to independently provide a desired amount of light to the combiner 206.

Other embodiments of the invention incorporate a color filter or color wheel to color the light provided by remote light source 203, so that the light source can be used to provide information in one or more colors to convey additional information to the pilot. Further embodiments will feature a remote light source that is either naturally similar in wavelength to the first light source or can be filtered to produce a wavelength similar to the first light source, so that the light provided by the two light sources together appears to be a single light source of the same color with greater intensity than either light source alone could produce.

Figure 3:
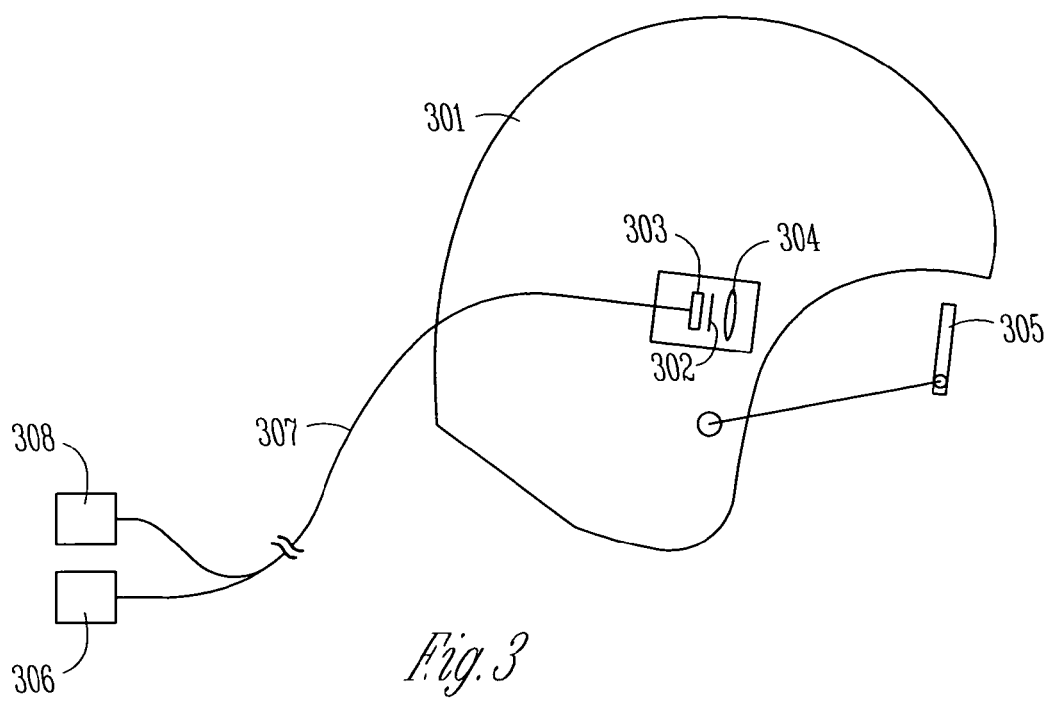
FIG. 3 shows a helmet-mounted liquid crystal display head-up display with a remotely coupled hybrid light source, consistent with an embodiment of the present invention.

FIG. 3 shows an alternate embodiment of the present invention, in which the head up display is mounted on a flight helmet. A flight helmet 301 has a liquid crystal display shutter 302, illuminated by a backlight light source 303 such as a fluorescent lamp, light-emitting diode illumination, or organic light emitting diode illumination. The image produced is projected through a lens or lens assembly 304, onto a semitransparent combiner 305 to produce a head-up display image. A remote light source 306 is coupled to the helmet via a cable assembly 307, containing a fiber optic cable that serves as a light pipe to transmit light from the remote light source 306 to the first light source cavity 303. Cable assembly 307 also comprises electronic cables connecting the LCD shutter 302 to head up display controller 308, which actuates the LCD shutter to produce a head up display image.

This configuration enables mounting a relatively small and light head up display assembly on a pilot's helmet, while offloading the relatively hot and heavy larger lamps and control circuitry needed to operate the head up display in various situations. Because a relatively bright, hot, and heavy remote light source 306 can be located remote from the pilot's head, the pilot can more comfortably use such a helmet-mounted head up display. The configuration shown here retains all the advantages of the dual light source head up display discussed previously, including redundancy, the ability to utilize color via a filtered remote light source, and the like.

Figure 4:
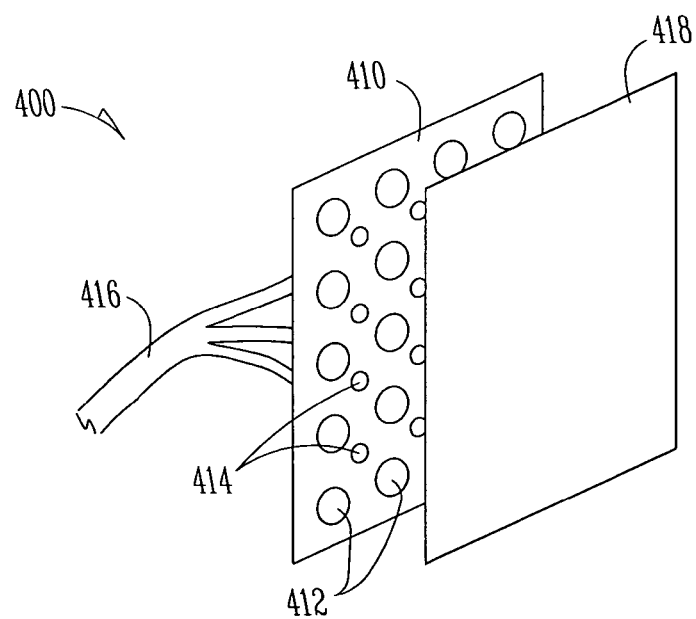
FIG. 4 shows a remotely coupled hybrid backlight, consistent with an example embodiment of the present invention.

A variety of backlight configurations can be adapted for use with the present invention, including several examples presented in greater detail in U.S. Pat. No. 5,751,388. In one example, uniformity of the illumination from the first and remote light sources can be maximized by injecting the light from the remote source in a manner consistent or congruent with the characteristics of the first light source and its corresponding optics. An example embodiment having congruent light injection is shown generally as hybrid backlight 400 in FIG. 4. A local light source comprises one or more LEDs 412 mounted on support 410, emitting light in the general direction of optical element 418. Light guide 416 transmits light from a remote light source, and delivers that light through one or more openings 414 in support 410. Optical element 418 mixes the locally generated light and the remotely generated light. The optical element 418 is in various embodiments a diffuser designed to mix or combine the light from the local light source LEDs 412 and light provided from the remote light source through openings 414, or is an integrating cavity, light pipe or lenticular element designed to achieve a similar effect. The light from LEDs 412 and the remote light from openings 414 enter the overlap region between support 410 and optical element 418 in a corresponding or congruent manner, in that the light proceeds through the rest of the system similarly for both. This allows for efficiency in the integration of the illumination from the sources.

Figure 5:
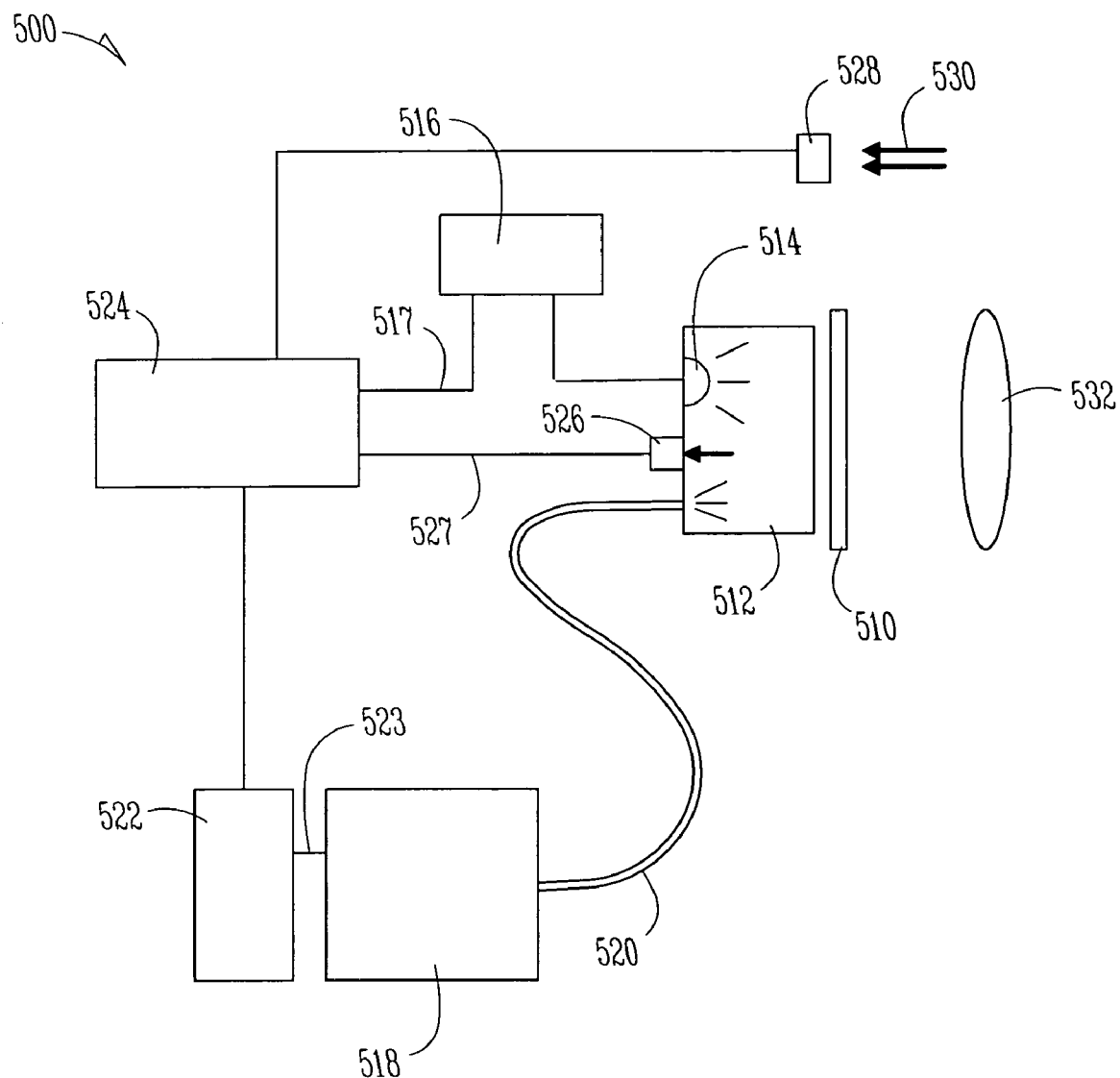
FIG. 5 shows a remotely coupled hybrid backlight including a controller, consistent with an example embodiment of the present invention.

The embodiment of FIG. 5 schematically shows a collimated display system 500 having a remotely coupled hybrid backlight cavity 512 illuminating a spatial light modulator 510, which in one example is a liquid crystal display (LCD). Reflective cavity 512 is the integrating means in this embodiment, and is illuminated locally by one or more LEDs 514 and remotely by remote light source 518 via light guide 520. The remote light source in this embodiment is a solid state laser with its output directed into light guide 520, although other light source types are used in other examples. Remote source controller 522 provides suitable power and signals to drive remote source 518, and local source controller 516 drives local source LEDs 514. Master luminance controller 524 commands source controllers 522 and 516 to produce more or less light via control lines 523 and 517, respectively. Cavity detector 526 senses the luminance in cavity 512 and feedback is routed to master luminance controller 524, for example through path 527.

In one particular example, master controller 524 selects a desired output luminance level based upon user inputs, such as user adjustable controls, which are for the present embodiment included in master controller 524. Master controller 524 also receives feedback regarding ambient light 530 from ambient light sensor 528, allowing master controller 524 to adjust the desired output luminance accordingly. The image generated by spatial light modulator 510 and illuminated by cavity 512, which receives light from light sources 514 locally and 518 remotely through light guide 520, is collimated by optics 532 prior to being viewed by a user. Optics 532 collimates the light in some embodiments directly by refraction, reflection, diffraction or a combination of these. Alternately, optics 532 may relay the image onto a diffusing screen prior to collimating the image for viewing. Optics 532 in some examples also includes a semitransparent reflector or combiner to allow the user to see the displayed image overlaid on a real scene, though in some instances a combiner may not be used or required.

Many variations are possible in controlling distribution of light generation between the two sources 514 and 518. One example method has master controller 524 select a desired luminance and command light generation from the local source 514 and its respective controller 516 until the desired luminance is achieved or a limiting factor is reached. Example limiting factors include preset power levels or temperature thresholds for the local source 514. Standard feedback techniques are used to maintain a steady luminance. If the desired luminance is not achieved, additional light output is commanded from remote source 518 and its respective controller 522 until the desired luminance is achieved or additional limiting factors are reached. Master controller 524 continually monitors cavity sensor 526, ambient light sensor 528 and any user adjustable inputs as well as checking applicable thresholds for temperature or power levels to maintain the output. In case of limiting thresholds or failure of either source, the master controller compensates to the extent allowed by adjusting the remaining source. The resulting system provides an extended range of luminance, adaptable thermal management, redundancy, and flexibility not present in prior art systems.

Figure 6:
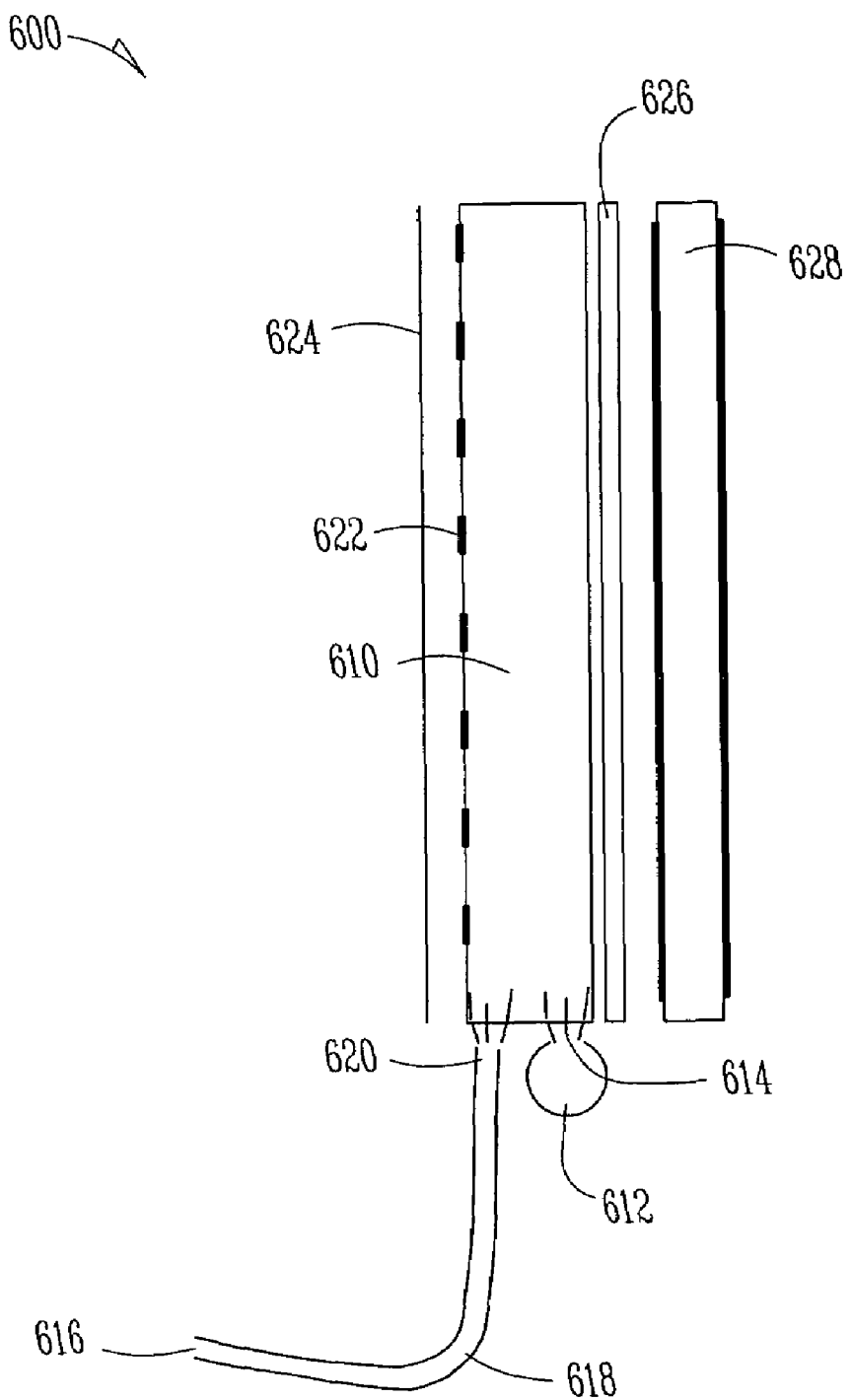
FIG. 6 shows an edge-lit remotely coupled hybrid backlight, consistent with an example embodiment of the present invention.

The embodiment of FIG. 6 is another example where light from the remote source is injected congruently with light from the local source, or is injected into an integrating mechanism in an analogous manner. The remotely coupled backlight and flat panel display system, shown generally at 600, is an adapted edge-lit system. Light from fluorescent aperture lamp 612 enters light guide 610 from one edge, at location 614. Light guide 618 transmits light from remote end 616 and remote source, not shown, and injects light from output end 620 into the edge of light guide 610. Light extraction features 622 redirect the light output of light guide 610 toward optical element 626, preferably a diffuser, and on toward flat panel 628. Rear reflector 624 redirects any light exiting the rear side of the light guide back to the front where it can contribute to the output luminance. This congruent injection method allows uniformity to be achieved independently of the ratio of local to remote light input. Together, optical element 626, reflector 624 and optical element 610 with extraction features 622 function as the integrating means for the two sources.

Figure 7:
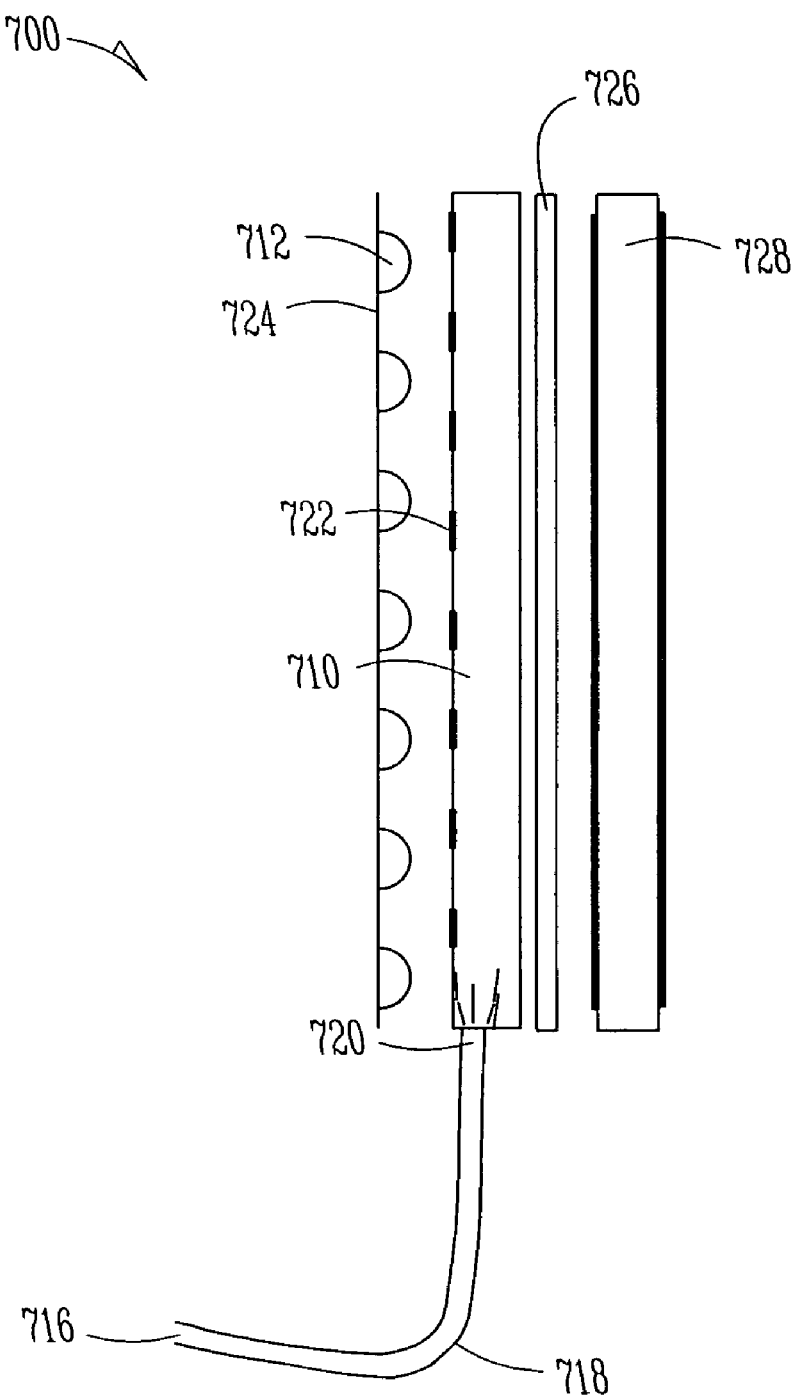
FIG. 7 shows a remotely coupled hybrid backlight having a light guide coupled to receive remotely generated light, consistent with an example embodiment of the present invention.

In the example embodiment 700 of FIG. 7, light guide 718 transmits light from the remote end 716 and injects it from local end 720 into the edge of light guide 710. As in the previous embodiment, extraction features 722 redirect light through optical element 726 and flat panel 728. In this embodiment, however, local light source 724, containing one or more LEDs 712 doubles as the rear reflector for the light guide, and is highly reflective. While the light from the two sources are not injected congruently, uniformity is maintained independent of the light generation ratio. If the presence of the extraction features introduces nonuniformity, LED spacing on local source 724 can be adjusted to compensate. Other local sources can be substituted for LED source 724, such as fluorescent, flat fluorescent, electroluminescent or vacuum fluorescent lamps, or an organic light emitting diode (OLED) backlight panel.

Figure 8:
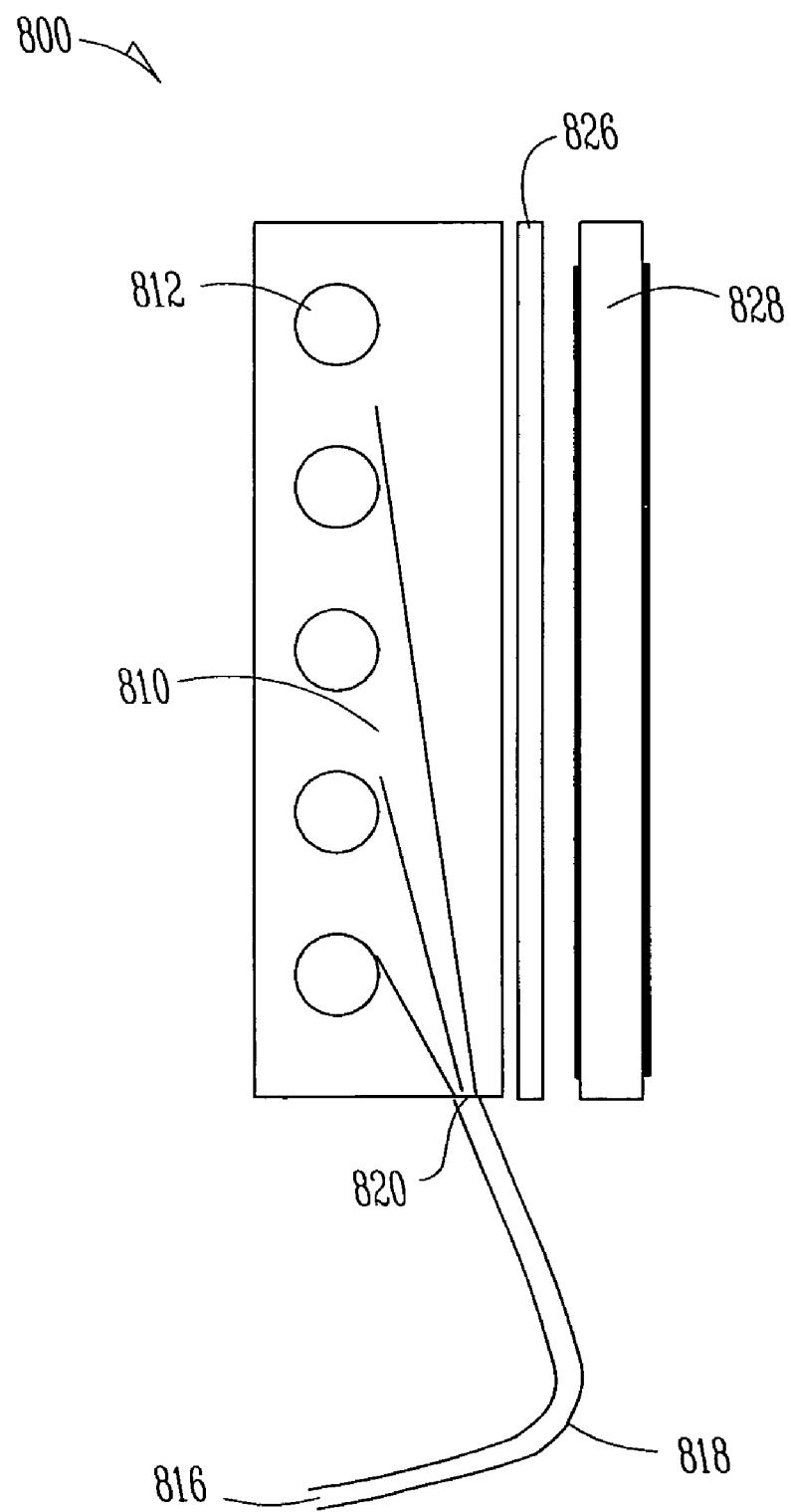
FIG. 8 shows a remotely coupled hybrid backlight having a light cavity, consistent with an example embodiment of the present invention.

In the embodiment of FIG. 8, remote light from light guide 818, transmitted from remote end 816, is injected from local end 820 into cavity 810 and into fluorescent tubular lamp segments 812 through the outer walls of the tubular lamps. The remotely generated light adds to the luminance of the local fluorescent source, eventually passing through optical element 826 and flat panel 828. Other entry points or injection angles of the remotely generated light may be used in various embodiments, for example from behind or from the end of the lamp segments 812, with varying degrees of efficiency and uniformity depending on the characteristics of integrating cavity 810 and optical element 826. In one example, the light from the remote source is injected into the first light source by shining the light through the glass and onto the phosphor, whereby some of the light is reflected out and some of the light spreads through the lamp. The first light source will therefore be illuminated both by its own action and by the light provided by the remote light source, and will cast a relatively similar distribution of light regardless of which light sources are currently generating light. Cavity 810 is reflective, and provides the integrating means along with optical element 826 and tubular lamp segments 812.

Figure 9:
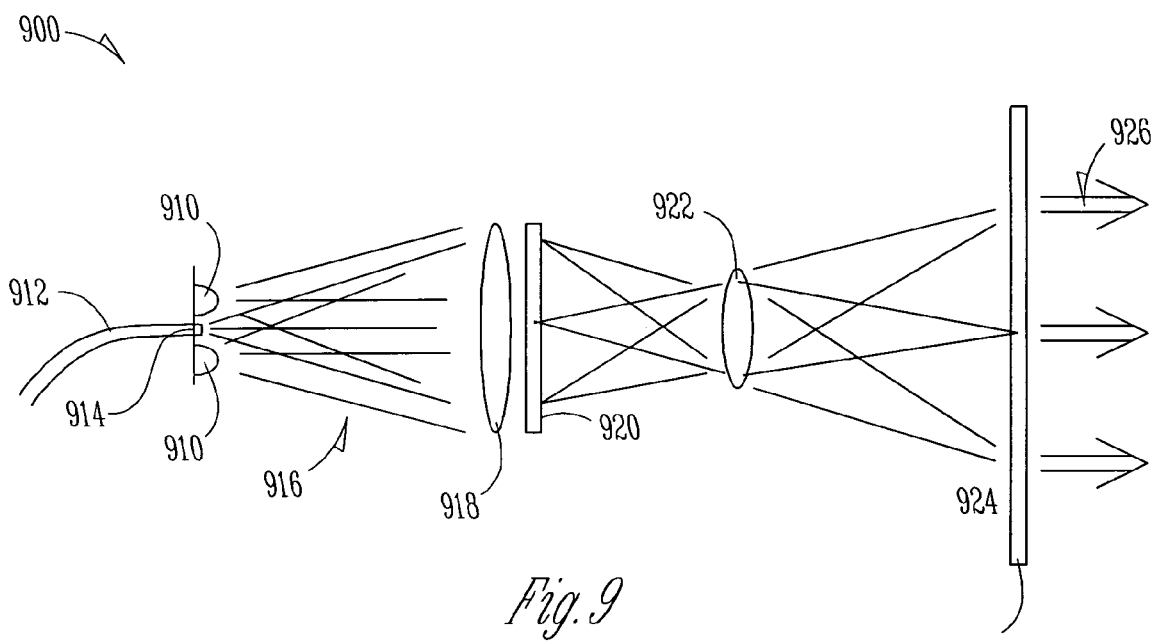
FIG. 9 shows a remotely coupled hybrid backlight comprising a projection system, consistent with an example embodiment of the present invention.

FIG. 9 shows a projection mode embodiment 900, where light valve 920 is reimaged by projection lens 922 onto projection screen 924. Light rays 926 exit screen 924 and are suitable for viewing directly from the screen or through collimating optics, not shown. One or more LEDs 910 provide a source of light local to the projector, while a remote source, not shown, is transmitted to the projector via light guide 912. One or more light guide outputs 914 are placed adjacent, and preferably between closely spaced LEDs 910 to make a hybrid light source with output rays 916. The light from the two light sources overlaps in the region of rays 916 and is integrated by lenses 918 and 922 and projection screen 924, where lens 918 redirects the rays 916 through the aperture of projection lens 922. As with previous examples, the combination of the local and remote sources offers significant advantages in terms of luminance capability, thermal management and redundancy.

Particular additional advantages can be achieved by appropriate selection of complementary light sources for the remote source and the local or first source. In one embodiment a high intensity short arc remote source having a narrow band spectral peak is combined with a local fluorescent lamp having a narrow band emission peak at approximately the same wavelength. This matching of the spectral output for the two sources maintains compatibility with the use of narrow band reflective combiners. In another embodiment, the spectral and temporal characteristics are deliberately varied by combining a relatively coherent laser remote source, for example a doubled diode-pumped solid state laser or one or more visible laser diodes, with an incoherent local source, for example an array of LEDs. The coherence of the laser makes it well-suited for efficient remote coupling through a modestly sized light guide, but increases the likelihood of coherence related artifacts such as speckle. The incoherence of the LED source avoids these artifacts at light levels where light from the remote source is not required, and greatly reduces the appearance of speckle when both sources are energized.

In another embodiment of the invention, the light coming from the remote light source is filtered with a polarizer mounted between the remote light source and the first light source cavity 202, and a backscattering polarizer is mounted between the light source cavity and the liquid crystal display shutter 201. This serves to backscatter light waves that are not of proper polarity to pass through the backscattering polarizer, and eventually passes the scattered light distributed throughout the first light cavity 202 when polarization of the scattered light is proper to achieve a more uniform light distribution across the LCD shutter 201.

Still other embodiments of the present invention are possible, such as a headset-mounted head up display, all of which are within the scope of the present invention. The embodiments of the present invention shown here illustrate how a combination of a first and a remote backlight for a head up display can reduce heat near a pilot, conserve precious cabin space, and make location of the head up display more flexible. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

The invention claimed is:

1. A head-up display assembly, comprising:
   a liquid crystal display element;
   an optical mixing element in proximity to the liquid crystal display element;
   a local light source physically mounted in proximity to the liquid crystal display element and the optical mixing element, the local light source operable to supply light to the optical mixing element for direct backlight illumination of the liquid crystal display element;
   a remote light source mounted physically remote from the liquid crystal display element and the local light source, the remote light source operable to supply light; and
   a fiber optic cable having a remote end coupled to the remote light source and a local end in proximity to the optical mixing element, the fiber optic cable configured to guide the light supplied from the remote light source directly to the optical mixing element.

2. The head-up display assembly of claim 1, wherein the display assembly is mounted in a flight helmet.

3. The head-up display assembly of claim 2, wherein the display assembly is configured to project onto a visor of the flight helmet.

4. The head up display assembly of claim 3, wherein the head-up display assembly is configured to project an image onto a combiner.

5. The head-up display assembly of claim 1, wherein the display assembly is mounted in an aircraft cabin.

6. The head-up display assembly of claim 1, wherein the display assembly is mounted to a headset.

7. The head-up display assembly of claim 1, wherein the remote light source comprises at least one of a short arc mercury lamp, a laser, a light-emitting diode, a fluorescent lamp, a cold cathode lamp, or a high intensity discharge lamp.

8. The head-up display assembly of claim 1, wherein the wavelengths of light emitted from the first light source and remote light source are substantially similar.

9. The head-up display assembly of claim 1, wherein the remote light source is selectively used to supplement the first light source.

10. The head-up display assembly of claim 1, wherein the remote light source is used as a redundant backlight for the first light source.

11. The head-up display assembly of claim 1, wherein the remote light source is operable to provide light of a different color than the first light source, enabling conveying information via the head-up display with color.

12. The head-up display assembly of claim 1, wherein light from the remote light source is injected into the first light source to maintain a uniform backlight distribution regardless of the light source.

13. The head-up display assembly of claim 1, wherein the first light source is mounted in a local cavity.

14. The head-up display assembly of claim 13, and further comprising:
   a backscattering polarizer mounted between the liquid crystal display element and the cavity; and
   a polarizer mounted between the cavity and the remote light source.

15. A method of backlighting a head-up display assembly, comprising:
   providing light from a local light source physically mounted in proximity to a liquid crystal display element and an optical mixing element and operable to supply light to the optical mixing element for direct backlight illumination of the liquid crystal display element; and
   providing light from a remote light source mounted physically remote from the liquid crystal display element and the local light source directly to an optical mixing element via a fiber optic cable having a remote end coupled to the remote light source and a local end in proximity to the optical mixing element.

16. The method of backlighting a head-up display assembly of claim 15, wherein the display assembly is mounted in a flight helmet.

17. The method of backlighting a head-up display assembly of claim 15, wherein the display assembly is configured to project onto a visor of the flight helmet.

18. The method of backlighting a head-up display assembly of claim 15, wherein the display assembly is mounted in an aircraft cabin.

19. The method of backlighting a head-up display assembly of claim 18, wherein the head-up display assembly is configured to project an image onto a combiner.

20. The method of backlighting a head-up display assembly of claim 15, wherein the display assembly is mounted to a headset.

21. The method of backlighting a head-up display assembly of claim 15, wherein the remote light source comprises at least one of a short arc mercury lamp, a laser, a light-emitting diode, a fluorescent lamp, a cold cathode lamp, or a high intensity discharge lamp.

22. The method of backlighting a head-up display assembly of claim 15, wherein the wavelengths of light emitted from the first light source and remote light source are substantially similar.

23. The method of backlighting a head-up display assembly of claim 15, wherein the remote light source is selectively used to supplement the first light source.

24. The method of backlighting a head-up display assembly of claim 15, wherein he remote light source is used as a redundant backlight for the first light source.

25. The method of backlighting a head-up display assembly of claim 15, wherein the remote light source is operable to provide light of a different color than the first light source, enabling conveying information via the head-up display with color.

26. The method of backlighting a head-up display assembly of claim 15, wherein light form the remote light source is injected into the first light source to maintain a uniform backlight distribution regardless of the light source.

27. The method of backlighting a head-up display assembly of claim 15, wherein: the first light source is mounted in a local cavity.

28. The method of backlighting a head-up display assembly of claim 27, further comprising:
mounting a backscattering polarizer between the liquid crystal display and the cavity; and
mounting a polarizer between the cavity and the remote light source.

29. A head-up display assembly, comprising:
a liquid crystal display element;
an optical mixing element in proximity to the liquid crystal display element;
a local light source physically mounted in proximity to the liquid crystal display element and the optical mixing element, the local light source operable to supply light to the optical mixing element for direct backlight illumination of the liquid crystal display element;
a remote light source mounted physically remote from the liquid crystal display element and the local light source, the remote light source operable to supply light;
a fiber optic cable having a remote end coupled to the remote light source and a local end in proximity to the optical mixing element, the fiber optic cable configured to guide the light supplied from the remote light source directly to the optical mixing element; and
a controller operable to control the light produced in at least one of the local light source and the remote light source.

30. The head-up display assembly of claim 29, in which the controller is operable to control light produced by at least one of the first light source and the remote light source based on a user desired luminance setting.

31. The head-up display assembly of claim 29, in which the controller further comprises a light sensor, and is operable to control light produced by at least one of the first light source and the remote light source based on a feedback signal provided from the light sensor.

32. The head-up display assembly of claim 29, in which the controller is operable to control light produced in at least one of the first light source and the remote light source based on at least one of a power level limit or a temperature limit for the light source.

* * * * *

UNITED STATES PATENT AND TRADEMARK OFFICE
CERTIFICATE OF CORRECTION

PATENT NO. : 7,413,328 B2 Page 1 of 1
APPLICATION NO. : 11/027558
DATED : August 19, 2008
INVENTOR(S) : Matthew Dubin et al.

It is certified that error appears in the above-identified patent and that said Letters Patent is hereby corrected as shown below:

Column 9, line 2, "he" should be changed to --the--;
Column 9, line 10, "form" should be changed to --from--.

Signed and Sealed this

Tenth Day of February, 2009

JOHN DOLL
*Acting Director of the United States Patent and Trademark Office*